United States Patent Office 3,253,010
Patented May 24, 1966

3,253,010
PROCESS FOR THE PRODUCTION OF ORGANIC ISOCYANATES FROM HYDRAZOBENZENES
Erich Klauke, Leverkusen, and Otto Bayer, Leverkusen-Bayerwerk, Germany, assignors to Farbenfabriken Bayer Aktiengesellschaft, Leverkusen, Germany, a German corporation
No Drawing. Filed Jan. 18, 1963, Ser. No. 252,289
Claims priority, application Germany, Jan. 24, 1962, F 35,840
9 Claims. (Cl. 260—453)

This invention relates to organic isocynates and more specifically to a novel process for the production of aromatic isocyanates.

The production of aromatic isocyanates from primary amines is well known in the art; for example, those described in Ann., 562, 75 (1949), and Houben-Weyl, 4th Edition, volume 8 (1952), page 119. The most commercially used process for the production of these isocyanates involves the phosgenation of primary amines. The amines used in this prior art method are usually obtained by rearrangement from the corresponding hydrazo compounds, then in a second procedure the amines are phosgenated to the desired isocyanate. This two step process is undesirable in that it requires first the preparation of the amine and secondly, the production of the desired isocyanate from the amine.

It is also known in the art to react acid anhydrides (such as benzoic acid anhydride) with hydrazobenzene compounds; however, in these reactions the product formed is exclusively the dibenzoyl-diphenyl anhydride, see for example, B. 47 (1914), 2657.

It is, therefore, an object of this invention to provide a novel method for the production of aromatic isocyanates. It is a further object of this invention to provide a process for the preparation of aromatic isocyanates which are devoid of the above-noted disadvantages. It is another object of this invention to provide a direct, improved process for the production of aromatic isocyanates in desirable yields. It is still a further object of this invention to provide an improved method for the production of aromatic isocyanates which do not require the primary preparation of amine reactants. Another still further object of this invention is to provide a direct method for the preparation of isocyanates wherein present equipment and facilities may be utilized.

The foregoing objects and others are accomplished in accordance with this invention, generally speaking, by providing a process for the production of aromatic isocyanates which comprises phosgenating a composition having the following general formula

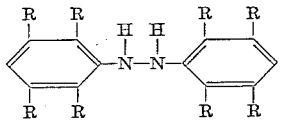

wherein R is a member selected from the group consisting of hydrogen, halogen, alkyl, alkoxy, acyloxy, carbalkoxy and mixtures thereof, and wherein the sum total of R substituents on both rings is up to 4. It is understood that the unsubstituted position indicated in the above general formula (para to the hydrazo group) is substituted by hydrogen. The other positions may or may not carry substituents. The substituents and the number of substituents in the above two aromatic rings can be the same or different. The above reaction of phosgene with the hydrazo benzene derivatives proceeds with a rearrangement which is similar to the reaction known as "benzidine rearrangement." The benzidine rearrangement is usually carried out in aqueous or aqueous-alcoholic solution. It is also known that this rearrangement can be effected in organic solvents with aqueous acids, organic acids and acid anhydrides as the rearranging agents. However phosgene has not previously so far been known as a rearranging agent. It was also not readily to be foreseen that the rearrangement with simultaneous acylation, i.e. isocyanate formation, would proceed so smoothly and with such good yields under the present gentle conditions.

The main product of the phosgenation of hydrazo benzene or its substitution products is the corresponding diphenyl-4,4′-diisocyanate. In addition, diphenyl-4,2′-diisocyanate, diphenyl-2,2′-diisocyanate and also phenyl isocyanate are also formed in varying amounts, as well as inter alia azobenzenes as secondary products and the corresponding substitution products. The yields, calculated according to the titrated total —N=C=O groups, are between 55 and 90% of the theoretical, depending on the nature of substituents R. The reaction takes place in inert organic solvents, such as those which are usual for the preparation of isocyanates by phosgenation of amines, for example methyl cyclohexane, xylene, chlorobenzene, o-dichlorobenzene, toluene, benzene, tetrahydronaphthalene, chlortoluenes, chlorinated aromatic hydrocarbons, nitrobenzene, kerosene, benzine, tetrachlorethylene, trichlorethylene, amylbenzene, o-, m-, and p-cymenes, dodecylbenzene, naphthalene, heptylcyclopentane, diphenyl, chlorinated diphenyls, heptane, hexane, dioxane, dibutylether, diisobutyl ketone and mixtures thereof.

The hydrazo compounds used in the present invention in the manner above noted are prepared in any known fashion, such as by the alkaline reduction of corresponding nitro compounds or azo compounds.

All compounds which enter into a benzidine or diphenyline rearrangement under the usual known conditions (Ann. 428, 76, 1922) can be used as hydrazo compounds, for example, Hydrazobenzene,
2-methyl-hydrazobenzene,
3-bromo-hydrazobenzene,
o- and m-Hydrazotoluene,
o- and m-Hydrazoanisole,
3,3′-dichloro-5,5′-dimethyl-hydrazobenzene,
3,3′-5,5′-tetrafluoro-hydrazobenzene,
Hydrazobenzene-3,3′-dicarboxylic acid ethyl ester,
o- and m-Hydrazo-phenetol-2,2′-diethyl hydrazo benzene,
2,2′-dimethyl hydrazo benzene,
3-butyl hydrazo benzene,
3,3′-dipropyl-hydrazo benzene,
Hydrazobenzene-2,2′-dicarboxylic acid propyl ester,
Hydrazobenzene-2-carboxylic acid methyl ester and
3,3′-5,5′-tetramethyl-hydrazobenzene.

It is often advisable to treat the solutions of the hydrazobenzenes prior to the phosgenation with hydrogen and catalysts in order to transform the last residues of any azobenzenes which are present into the hydrazobenzenes.

The phosgenation of the hydrazo compounds which are suspended or dissolved in the solvent can be carried out in various ways. At a temperature of 100 to 200° C. and preferably 100 to 120° C., the solution is treated directly with excess phosgene until the solution becomes clear. The yields are, however, always better if the phosgenation is carried out in two stages.

In a preferred embodiment of this invention, all the solution of the hydrazo compound is treated at low temperatures of about 0 to 30° C., it being immaterial as regards the course of the reaction whether phosgene is introduced into the solution or the solution is run into an initially supplied phosgene solution. The reaction mixture is then heated and the phosgenation is completed at a temperature between 100 and 200° C.

The working up takes place after blowing off the excess phosgene and HCl with inert gases such as carbon dioxide or nitrogen at high temperatures, for example, 110 to 130° C., preferably by distillation of the solvent. The residue contains the crude isocyanate in admixture with the secondary products which form in varying quantities. If necessary, purification can be effected by crystallization or by distillation.

For many purposes of use, it is sometimes desirable to have the isocyanates in liquid form. It is then advantageous to have available mixture of different isocyanates in order to suppress a crystallization. In this case, it is readily possible to start from mixtures of different hydrazo compounds and to subject these to the process according to the invention.

The isocyanates prepared by the method of this invention are useful as intermediates in producing many valuable materials such as plastics and plant protection agents. For example, they may be reacted with an organic compound containing active hydrogen groups to produce polyurethanes in the form of cellular or elastomeric products. The cellular products are useful, for example, insulating materials, seat cushions, pillows and the like. The elastomeric materials are useful as automobile tires, valve buttons, gears, accumulator bladders and the like. The products obtained by the process of the present invention are also desirable in the preparation of herbicides, plant growth regulants and insecticides.

The following examples will further define the process of this invention. Parts are by weight unless otherwise specifically set out.

*Example 1*

A solution of about 500 ml. of chlorobenzene and about 300 parts of phosgene is initially supplied. A solution of about 92 parts of hydrazobenzene in about 1500 ml. of chlorobenzene is run in over a period of 1½ hour at about 0 to 10° C. The temperature is then slowly raised to 120° C. After a temperature of about 100° C. is reached a stream of phosgene is introduced at a rate of about 100 parts per hour. After about 30 minutes, the solution is clear and phosgenation is carried out for another 60 minutes, the excess phosgene and hydrogen chloride is blown off with carbon dioxide at the same temperature and the solvent is distilled off. The dark crystalline residue amounting to about 116 parts has an NCO content of about 23.6%, which corresponds to a yield of 65% of the theoretical. By distillation, it is possible to isolate the diphenyl-4,4'-diisocyanate with a boiling point of about 155 to 165° C. and a melting point of about 118° C. from the crude mixture.

*Example 2*

About 92 parts of hydrazobenzene are dissolved in 1750 parts of chlorobenzene and heated to 120° C. A stream of phosgene is conveyed through this solution for about two hours at a rate of about 150 parts per hour. A reddish brown clear solution is thereby formed and this solution is blown for about two hours with a strong stream of carbon dioxide. After cooling, these 1821 parts of solution shown an NCO value of about 1.41%, this corresponding to a yield of about 61% of the theoretical.

*Example 3*

A stream of phosgene at a rate of about 100 parts per hour is introduced for 2½ hours into a solution of about 85 parts of 2,2'-dimethyl-hydrazobenzene in about 1500 ml. of chlorobenzene. Provision is made for the temperature not to exceed about 20° C. by occasionally cooling. A crystalline deposit is formed, which does not interfere with the stirrability. After completing the introduction of phosgene, the mixture is slowly heated to 125° C., a gentle stream of phosgene being continuously conducted therethrough. The solution becomes clear between about 60 to 70° C. Phosgenation is continued for another 30 minutes at about 125° C. and the substance is thereafter worked up as in Example 1. As residue, there are obtained about 142 parts of a reddish liquid with an NCO content of about 21%, this corresponding to a yield of 89% of the theoretical. After standing for a relatively long time, a few crystals precipitate and these are colorless after being recrystallized once from ligroin. Melting point about 68 to 69° C., NCO content about 31.8%. The substance is 3,3'-dimethyl-diphenyl-4,4'-diisocyanate.

*Example 4*

Under the same conditions as indicated in Example 3, the 3,3'-dimethyl-hydrazobenzene produces as residue about 129 parts of a brown oil with an NCO content of about 21.2% corresponding to a yield of about 64.3% of the theoretical.

*Example 5*

Under the conditions as indicated in Example 3, about ½ mol=122 parts of o-hydrazoanisole are phosgenated. As residue, there is left a dark red oil with crystalline fractions. The yield of isocyanate is about 70.2% of the theoretical. The crystals are suction-filtered and after repeated recrystallization from washed benzine, have a melting point of about 153 to about 156° C. (2,2'-dimethoxy-azobenzene).

*Example 6*

About 126 parts of 2,2'-dichloro-hydrazobenzene are dissolved in about 2.5 kg. of o-dichlorobenzene, and first of all about 200 parts of phosgene are added at about 20° C. and after heating to about 120° C., the solution is treated for another 30 minutes with gaseous phosgene. A strong stream of carbon dioxide is thereafter conducted through the solution for about two hours at about 120° C. The substance is allowed to cool, it is filtered and there are obtained about 2602 parts of a reddish clear solution with an NCO content of about 1.375% which corresponds to a yield of about 85% of the theoretical.

Although the invention has been described in considerable detail in the foregoing, it is to be understood that the purpose of such detail is solely to illustrate the embodiments of the invention and that modifications can be made by those skilled in the art without departing from the spirit and scope of the invention as set forth in the claims.

What is claimed is:

1. A process for making an aromatic isocyanate which comprises reacting phosgene with a compound having the formula

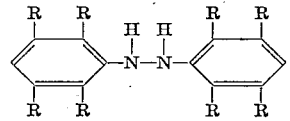

wherein R is a member selected from the group consisting of hydrogen, halogen, lower alkyl, lower alkoxy, carb-lower alkoxy and wherein the total number of substituents on both rings is up to 4.

2. The process of claim 1 wherein phosgene is reacted with the compound of the formula at a temperature of from about 0° to about 30° C. in a first step and the resulting product is heated in a second step to a temperature of from about 100° to about 200° C.

3. The process of claim 1 wherein said reaction is conducted in the presence of an inert organic solvent.

4. The process of claim 1 wherein the reaction is carried out at a temperature of from about 100 to 200° C.

5. The process of claim 1 wherein said reaction is conducted at a temperature of about 100° C. to 120° C.

6. The process of claim 2 wherein said reaction is conducted in the presence of an inert organic solvent.

7. A process for production of aromatic isocyanates which comprises in a first step reacting phosgene at a temperature of about 0 to 30° C. with a hydrazo compound selected from the group consisting of hydrazobenzene, 2 - methyl-hydrazobenzene, 3 - bromo-hydrazobenzene, o- and m-hydrazotoluene, o- and m-hydrazoanisole, 3,3'-dichloro-5,5'-dimethyl hydrazobenzene, 3,3'-5,5'-tetrafluoro hydrazobenzene, hydrazobenzene 3,3'-dicarboxylic acid ethyl ester, o- and m-hydrazo-phenetol-2,2'-diethyl hydrazo benzene, 3,3'-5,5'-tetramethyl hydrazobenzene, 2,2'-dimethyl hydrazobenzene, 3-butyl hydrazobenzene, 3,3'-dipropylhydrazo benzene, hydrazobenzene-2,2'-dicarboxylic acid propyl ester and hydrazobenzene-2-carboxylic acid methyl ester and mixtures thereof and in a second step heating the resulting reaction mixture to a temperature of about 100 to about 200° C.

8. A process for the production of aromatic isocyanates which comprises reacting phosgene with hydrazobenzene at a temperature of from about 0° C. to about 100° C. in the presence of an inert organic solvent.

9. A process for the production of aromatic isocyanates which comprises reacting phosgene with a lower alkyl substituted hydrazobenzene at a temperature of from about 0° C. to 20° C. in the presence of chlorobenzene and thereafter heating the reaction mixture in the presence of additional phosgene to a temperature of from about 100° C. to about 130° C.

References Cited by the Examiner

UNITED STATES PATENTS

| 2,643,264 | 6/1953 | Fauser | 260—453 |
| 2,683,730 | 7/1954 | Seeger et al. | 260—453 |
| 2,908,704 | 10/1959 | Skiles | 260—453 |
| 2,938,054 | 5/1960 | Demers et al. | 260—453 |

OTHER REFERENCES

Hammond et al.: Tetrahedron Letters, No. 21, 1962, pp. 945–949.

CHARLES B. PARKER, *Primary Examiner.*

DALE R. MAHANAND, *Assistant Examiner.*